United States Patent
Frydendal et al.

(10) Patent No.: US 10,612,586 B2
(45) Date of Patent: Apr. 7, 2020

(54) THRUST BEARING FOR A WIND TURBINE

(71) Applicant: Siemens Gamesa Renewable Energy A/S, Brande (DK)

(72) Inventors: Niels Karl Frydendal, Herning (DK); Gustav Hoegh, Vejle (DK); Troels Kanstrup, Rask Moelle (DK); Dennis Olesen, Aarhus (DK); Kim Thomsen, Skørping (DK); Morten Thorhauge, Aarhus (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 0 days.

(21) Appl. No.: 16/132,553

(22) Filed: Sep. 17, 2018

(65) Prior Publication Data
US 2019/0085831 A1 Mar. 21, 2019

(30) Foreign Application Priority Data
Sep. 20, 2017 (EP) .................... 17192103

(51) Int. Cl.
| F16C 25/04 | (2006.01) |
| F16C 17/24 | (2006.01) |
| F16C 17/06 | (2006.01) |
| F03D 80/70 | (2016.01) |
| F16C 41/00 | (2006.01) |

(52) U.S. Cl.
CPC .............. *F16C 25/04* (2013.01); *F03D 80/70* (2016.05); *F16C 17/06* (2013.01); *F16C 17/24* (2013.01); *F16C 41/00* (2013.01); *F05B 2240/52* (2013.01); *F16C 2208/32* (2013.01); *F16C 2360/31* (2013.01)

(58) Field of Classification Search
CPC ........ F16C 17/06; F16C 17/24; F16C 17/243; F16C 17/246; F16C 25/04
See application file for complete search history.

(56) References Cited

U.S. PATENT DOCUMENTS

| 1,754,324 A * | 4/1930 | Kingsbury .............. F16C 17/06 384/224 |
| 2,778,696 A | 1/1957 | Lease |
| 3,033,619 A * | 5/1962 | Ertl .......................... F16C 17/06 384/308 |
| 3,087,330 A | 4/1963 | Metzmeier |
| 3,132,908 A | 5/1964 | Grotzinger |
| 3,829,179 A * | 8/1974 | Kurita ................. F04D 29/0413 384/224 |

(Continued)

FOREIGN PATENT DOCUMENTS

| WO | WO 2005015064 A1 | 2/2005 |
| WO | WO 2011003482 A2 | 1/2011 |

*Primary Examiner* — James Pilkington
(74) *Attorney, Agent, or Firm* — Schmeiser, Olsen & Watts LLP

(57) ABSTRACT

Provided is a thrust bearing for a wind turbine including a thrust collar rotatable around a longitudinal axis of the thrust bearing and having a thrust surface transversally oriented with respect to longitudinal axis, a support structure fixed with respect to the longitudinal axis of the thrust bearing, a bearing pad contacting the thrust surface of the thrust collar and movable on a pad seat provided on the support structure, a spring element interposed between the bearing pad and the support structure.

13 Claims, 3 Drawing Sheets

(56) References Cited

U.S. PATENT DOCUMENTS

| | | | |
|---|---|---|---|
| 3,930,691 A * | 1/1976 | Greene | F16C 17/03 384/224 |
| 4,286,828 A * | 9/1981 | Sides | F16C 17/03 384/215 |
| 2012/0020595 A1 | 1/2012 | Kim | |
| 2015/0159693 A1 | 6/2015 | Corts | |

* cited by examiner

THRUST BEARING FOR A WIND TURBINE

CROSS-REFERENCE TO RELATED APPLICATIONS

This application claims priority to European application No. 17192103.4 having a filing date of Sep. 20, 2017 the entire contents of which are hereby incorporated by reference.

FIELD OF TECHNOLOGY

The following relates to a thrust bearing for a wind turbine.

BACKGROUND

The increasing size of wind turbines and trend towards offshore turbines puts high demands on serviceability and robustness that the current rolling element bearing systems cannot provide. Also, due to fact that large wind turbines have large dynamic shaft deflections, high loads and low speeds makes it difficult for plain bearings to work and last in the demanded lifetime.

Conventional wind turbine designs use conventional roller bearings or ball bearings for carrying the drive train, the generator on direct drive turbines and hub with blades require. When such conventional roller bearings or ball bearings have to be replaced, for example at the end of their life cycle, this can be performed only by disassembling the drive train, the generator and/or the hub with blade. These operations require the use of a costly crane capacity. Such costs are especially high for wind turbines located offshore, for which a jackup vessel has to be used.

One solution to the above problem is the use of fluid bearings instead of roller bearings or ball bearings.

Another solution to the above problem is to enhance the serviceability of the roller bearings or ball bearings to a higher level. In particular, it is known that the structural integrity of ball or roller bearings is significantly compromised by any axial movement caused by axial thrust forces.

Therefore, serviceability of the roller bearings or ball bearings may be improved by completely or at least in part by absorbing such axial thrust forces.

In addition, it is further important in wind turbines to know the value of such axial thrust force. Measurement of the thrust force on the wind turbine rotor provides a significant amount of information about the operational state of the turbine. The information can be used by the control system to reduce loading on main components e.g. tower, blades etc.

A common way of measuring the rotor thrust is by measuring the strain in the individual blade roots and transforming the measurement to collective rotor thrust. The strain measurement is typically performed using strain gauges or most recently fiber Bragg sensors. Another method is measuring strain on a main support structure on the turbine e.g. the main shaft.

The main issue with these approaches it that strain gauges need maintenance during the lifetime and for complex structures like the main shaft of a direct drive turbine the strain distribution is complex making the placement of the strain gauges and strain to thrust transformations a critical problem.

It is a purpose of embodiments of the present invention to provide a thrust bearing for a wind turbine, which absorbs the axial thrust forces, acting on ball or roller or fluid bearings, in order to enhance the serviceability of the wind turbine. It is desirable that the thrust bearing itself provides an enhanced level of serviceability by allowing easy maintenance and replacement of the thrust bearing.

It is a further purpose of embodiments of the present invention to provide a thrust bearing for a wind turbine, which allows a simple robust and cheap method for measuring the thrust force acting on the thrust bearing.

SUMMARY

According to embodiments of the invention there is provided a thrust bearing for a wind turbine comprising:
a thrust collar rotatable around a longitudinal axis of the thrust bearing and having a thrust surface transversally oriented with respect to a longitudinal axis,
a support structure fixed with respect to the longitudinal axis of the thrust bearing,
a bearing pad contacting the thrust surface of the thrust collar and movable on a pad seat provided on the support structure,
wherein at least a spring element is interposed between the bearing pad and the support structure.

This design enhances the serviceability of the main bearing (ball or roller or fluid bearing) to a higher level, with respect to known solutions, by allowing replacement without the use of a major crane (or jackup vessel) or even special tools installed in the turbine. When the springs are worn or broken the wind turbine can continue to operate and the replacement can be done during a planned maintenance service. Each bearing pad may be removed, inspected and serviced individually and without moving the shaft to unload thrust bearing.

Any thrust force acting on the bearing pad results in a small axial movement until the equilibrium is reached between the thrust force and the opposite spring force in the spring element. This means that the thrust force can be measured by the deformation of the spring element.

Measurement of a deformation for deriving the value of the thrust force is a much simpler and robust than measuring strain.

In embodiments of the present invention the bearing pad comprises a low friction layer contacting the thrust surface of the thrust collar.

Advantageously, this enables low friction contact between the pad and the thrust collar, thus reducing wear.

In embodiments of the present invention, the bearing pad is preferably annularly shaped about the longitudinal axis of the thrust bearing.

Alternatively, the bearing pad may be of another shape or may be not continuously distributed around the longitudinal axis of the thrust bearing.

In embodiments of the present invention at least a portion of the bearing pad is tapered with respect to the pad seat. In particular, at least a portion of the bearing pad may have a conical section. Advantageously, this prevents locking of the bearing pad with respect to the pad seat.

According to other embodiments of the invention, the bearing pad comprises a male element and a female element coupled to one another with backlash, the male element being inserted in a pocket of the female element allowing relative tilting between the male element and the female element about an axis orthogonal to the longitudinal axis. Advantageously, this permits correcting misalignment of the bearing pad with respect to the thrust collar and the longitudinal axis of the thrust bearing.

According to embodiments of the invention, the spring element comprises at least a steel or a polymer spring.

Particularly, the spring element comprises at least a helicoidal spring or a Belleville spring or an elastomer layer.

Any type of spring element may be associated to a system for measuring the deformation for determining the thrust force acting on the thrust bearing.

Particularly, according to embodiments of the present invention, the elastomer layer is attached to a steel discs.

More particularly, according to a specific embodiment of the present invention, the spring element includes a stack having a plurality of elastomer layers attached to respective steel discs. Each elastomer layer may be glued to the respective steel discs to improve adhesion.

The aspects defined above and further aspects of embodiments of the present invention are apparent from the examples of embodiment to be described hereinafter and are explained with reference to the examples of embodiment. The following will be described in more detail hereinafter with reference to examples of embodiment but to which embodiments of the invention is not limited.

BRIEF DESCRIPTION

Some of the embodiments will be described in detail, with references to the following figures, wherein like designations denote like members, wherein.

DETAILED DESCRIPTION

Figure 1:
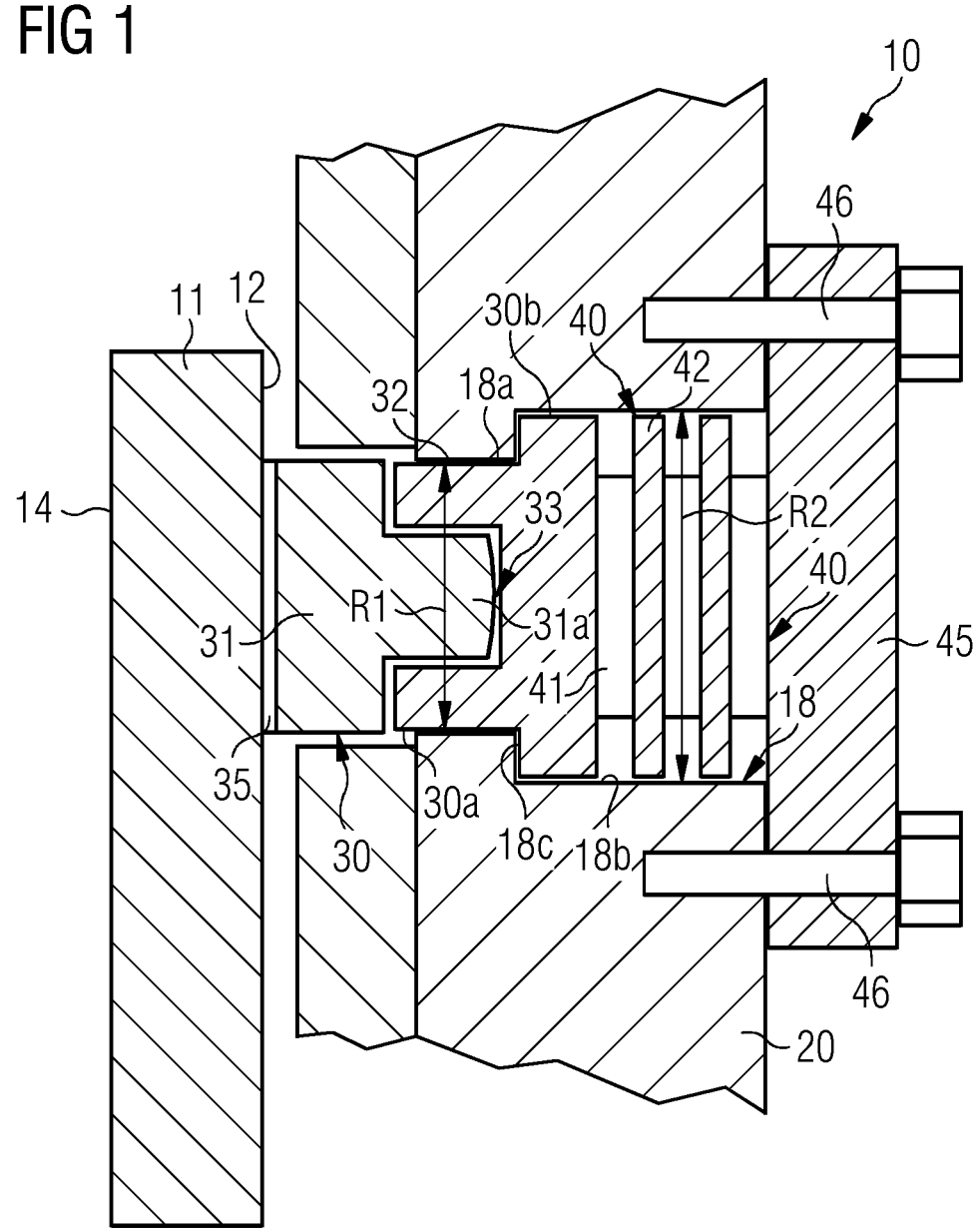
FIG. 1 shows a schematic sectional view of a first embodiment of thrust bearing for a wind turbine according to embodiments of the present invention.

The illustrations in the drawings are schematic. It is noted that in different figures, similar or identical elements or features are provided with the same reference signs. In order to avoid unnecessary repetitions elements or features which have already been described with respect to an embodiment are not described again further in the description.

FIGS. 1 to 4 show four respective embodiments of a thrust bearing 10 for a wind turbine, according to embodiments of the present invention. The thrust bearing 10 comprises a thrust collar 11 rotatable around a longitudinal axis Y of the thrust bearing 10. The thrust collar 11 is a disc attached to a shaft 13 of the wind turbine. The shaft 13 extends longitudinally with respect to the longitudinal axis Y and is subject to rotate around the longitudinal axis Y.

In the following the terms "longitudinal", "radial" and "circumferential" are referred, when not differently specified, to the longitudinal axis Y of the thrust bearing 10.

The thrust collar 11 comprises two main circular plane surfaces 12, 14, including a first thrust surface 12 for transferring a thrust force of the thrust bearing 10 to other components of the thrust bearing 10, as better detailed in the following, and a second opposite surface 14. The two main surfaces of the thrust collar 11 are transversally oriented with respect to the longitudinal axis Y. In particular, the two main circular plane surfaces 12, 14 may be radially oriented with respect to the longitudinal axis Y.

The thrust bearing 10 further comprises:

a support structure 20 fixed with respect to the longitudinal axis Y of the thrust bearing 10, and a bearing pad 30 contacting the thrust surface 12 of the thrust collar 11 and movable on a pad seat 18 provided on the support structure 20.

The bearing pad 30 is annularly shaped about the longitudinal axis Y of the thrust bearing 10.

The thrust bearing 10 further comprises at least a spring element 40 is interposed between the bearing pad 30 and the support structure 20.

According to other embodiments of the present invention (not shown) the bearing pad 30 has a different shape. In all the embodiments of the present invention the bearing pad 30 provides transferring of a thrust force between the thrust collar 11 and the spring element 40.

The pad seat 18 has a shape corresponding to the shape of the bearing pad 30 and allowing the bearing pad 30 to translate at least along a direction parallel to the longitudinal axis Y.

On a side of the spring element 40 opposite to the bearing pad 30, the spring element 40 contacts a thrust plate 45, which is fixed to the support structure 20 by means of a plurality of screws 46.

The spring element 40 is interposed between the bearing pad 30 and thrust plate 45, in such a way that the thrust force from the thrust collar 11 is transferred to the thrust plate 45 through the spring element 40.

The thrust force causes the spring element 40 to deform. The thrust bearing 10 includes a system (not shown) for measuring such deformation and consequently calculating the thrust force acting on the thrust collar 11.

The bearing pad 30, on a face contacting the thrust surface 12 of the thrust collar 11, comprises a low friction layer 35 for reducing friction caused by the contact between the bearing pad 30 and the thrust collar 11 and due to the rotation of the thrust collar 11.

Figure 2:
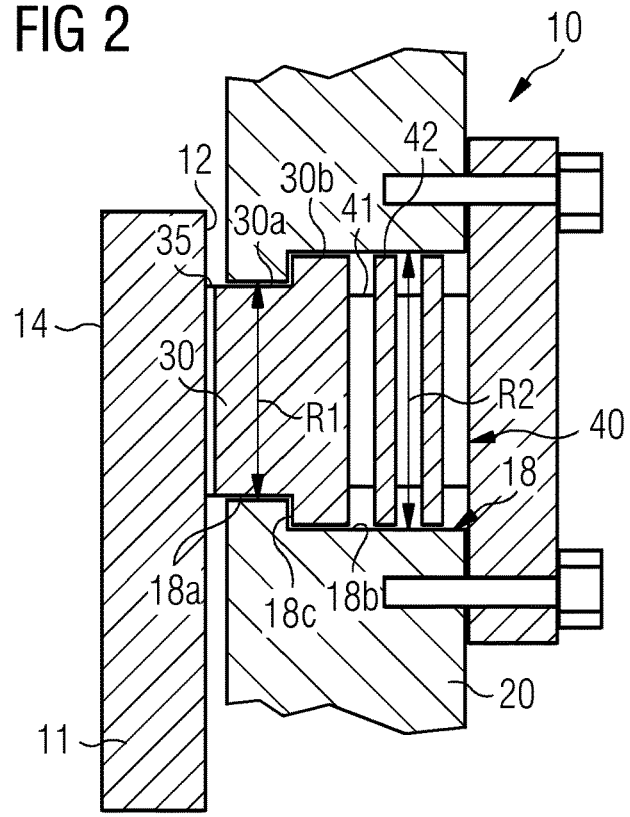
FIG. 2 shows a schematic sectional view of a second embodiment of thrust bearing for a wind turbine according to embodiments of the present invention.
Figure 3:
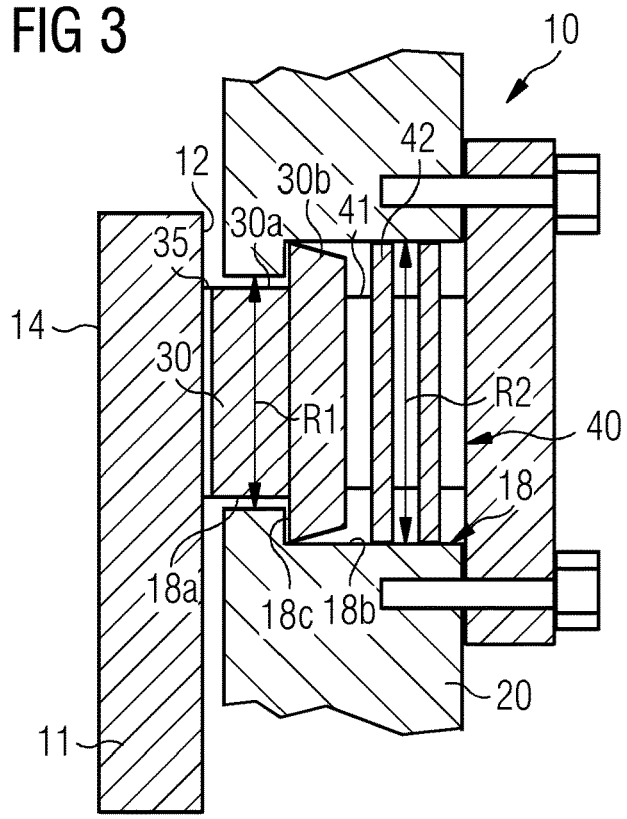
FIG. 3 shows a schematic sectional view of a third embodiment of thrust bearing for a wind turbine according to embodiments of the present invention.

With reference to the embodiments of FIGS. 1 to 3, the pad seat 18 comprises a first portion 18a and a second portion 18b, longitudinally adjacent to each other. The first portion 18a has a first radial extension R1 while the second portion 18b has a second radial extension R2, greater than the first radial extension R1. The first portion 18a is adjacent to the thrust collar 11 while the second portion 18b is adjacent to the thrust plate 45 and houses the spring element 40.

Consequently, the bearing pad 30 comprises a first portion 30a coupled with the first portion 18a of the pad seat 18 and a second portion 30b coupled with the second portion 18b of the pad seat 18. The shoulder 18c between the first portion 18a and the second portion 18b of the pad seat 18 prevents the bearing pad 30 from exiting the pad seat 18 in the longitudinal direction towards the thrust collar 11.

The shoulder 18c also allows preloading the spring element 40 when assembling it in the thrust bearing. If the spring element 40 is a too long it will be preloaded when bolting plate 45 to the support structure 20 with bolts 46.

With specific reference to the embodiment of FIG. 1, the bearing pad 30 comprises a male element 31 and a female element 32 coupled to one another with backlash for correcting misalignment of the bearing pad 30 with respect to the thrust collar 11 and to the longitudinal axis Y.

The male element 31 includes a longitudinal protrusion 31a inserted in a pocket 33 of the female element 32 allowing relative tilting between the male element 31 and the female element 32 about an axis orthogonal to the longitudinal axis Y.

The bearing pad 30 is oriented in such a way that the male element 31 contacts the thrust surface 12 of the thrust collar 11 and the female element 32 contacts the spring element 40. The second portion 30b of the bearing pad 30 is provided on the female element 32, which is coupled with both the first portion 18a and the second portion 18b of the pad seat 18.

With specific reference to the embodiment of FIG. 2, the bearing pad 30 is made of a single solid element, wherein both the first portion 30a and the second portion 30b extends in the longitudinal direction parallel to the respective first portion 18a and second portion 18b of the pad seat 18.

With specific reference to the embodiment of FIG. 3, the bearing pad 30 is made of a single solid element, wherein the first portion 30a extends in the longitudinal direction parallel but distanced to the respective first portion 18a of the pad seat 18. The second portion 30b is tapered with respect to the respective second portion 18b of the pad seat 18. In particular, second portion 30b is conical in the section view of FIG. 3. Such design of the bearing pad 30 prevents locking with respect to the pad seat 18.

In the embodiments of FIGS. 1 to 3 the spring element 40 comprises a plurality of elastomer layers 41 and a plurality of steel discs 42. Elastomer layers 41 and steel discs 42 are interposed to one another to create a stack where each elastomer layers 41 is interposed between two respective steel discs 42 or between a steel disc 42 and the bearing pad 30 or between a steel disc 42 and the thrust plate 45.

Each elastomer layer 41 is attached by gluing to a respective steel disc 42 to improve adhesion.

Figure 4:
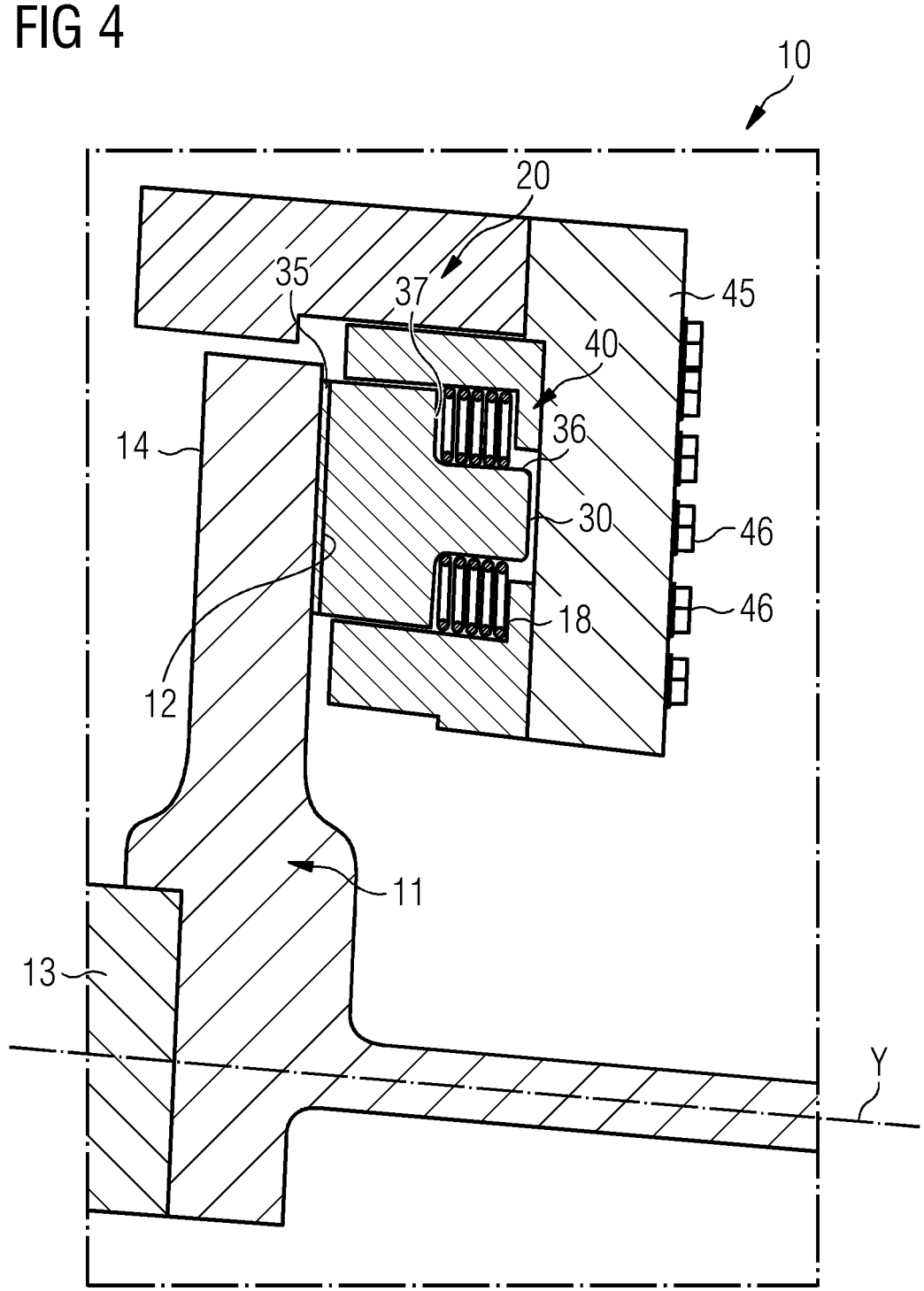
FIG. 4 shows a schematic sectional view of a fourth embodiment of thrust bearing for a wind turbine according to embodiments of the present invention.

In the embodiment of FIG. 4, the bearing pad 30 includes a longitudinal protrusion 36 extending towards the thrust plate 45 but longitudinally distanced from the thrust plate 45. The spring element 40 includes a steel or a polymer spring housed in the pad seat 18 around the longitudinal protrusion 36 and active between a shoulder 37 of the bearing pad 30 and the thrust plate 45.

The steel or polymer spring 40 in the embodiment of FIG. 4 may be a helicoidal spring or a Belleville spring or another type of spring capable of transferring the thrust force from the thrust collar 11 to the thrust plate 45.

A polymer spring may be preferred in some embodiments of the present invention considering that such type of spring yields a reaction force even in case of breakage, wear or slow degeneration.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A thrust bearing for a wind turbine comprising:
    a thrust collar rotatable around a longitudinal axis of the thrust bearing and having a thrust surface transversally oriented with respect to a longitudinal axis,
    a support structure fixed with respect to the longitudinal axis of the thrust bearing,
    a thrust plate attached to the support structure,
    a bearing pad contacting the thrust surface of the thrust collar and movable on a pad seat provided on the support structure, wherein the pad seat has a first portion and a second portion longitudinally adjacent to each other, wherein the first portion is adjacent to the thrust collar and has a first radial extension, wherein the second portion is adjacent to the thrust plate has a second radial extension, wherein the second radial extension is greater than the first radial extension, wherein at least a portion of the bearing pad is tapered with respect to the pad seat, and
    a spring element interposed between the bearing pad and the thrust plate, element.

2. The thrust bearing of claim 1, wherein the bearing pad comprises a friction reducing layer contacting the thrust surface of the thrust collar.

3. The thrust bearing of claim 1, wherein the bearing pad is annularly shaped about the longitudinal axis of the thrust bearing.

4. The thrust bearing of claim 1, wherein the at least a portion of the bearing pad has a conical section.

5. The thrust bearing of claim 1, wherein the bearing pad comprises a male element and a female element coupled to one another with backlash, the male element being inserted in a pocket of the female element allowing relative tilting between the male element and the female element about an axis orthogonal to the longitudinal axis.

6. The thrust bearing of claim 5, wherein the male element contacts the thrust surface of the thrust collar and the female element contacts the spring element.

7. The thrust bearing of claim 1, wherein the spring element comprises at least a steel or a polymer spring.

8. The thrust bearing of claim 7, wherein the spring element comprises at least a helicoidal spring or a Belleville spring.

9. The thrust bearing of claim 1, wherein the spring element comprises at least an elastomer layer.

10. The thrust bearing of claim 9, wherein the elastomer layer is attached to a steel disc.

11. The thrust bearing of claim 10, wherein the spring element comprises a stack of a plurality of elastomer layers attached to respective steel discs.

12. The thrust bearing of claim 1, wherein a pad seat shoulder is formed at the intersection of the first portion and the second portion, further wherein the pad seat shoulder prevents the bearing pad from exiting the pad seat.

13. A thrust bearing for a wind turbine comprising:
    a thrust collar rotatable around a longitudinal axis of the thrust bearing and having a thrust surface transversally oriented with respect to a longitudinal axis,
    a support structure fixed with respect to the longitudinal axis of the thrust bearing,
    a thrust plate attached to the support structure,
    a bearing pad contacting the thrust surface of the thrust collar and movable on a pad seat provided on the support structure, wherein the pad seat has a first portion and a second portion longitudinally adjacent to each other, wherein the first portion is adjacent to the thrust collar and has a first radial extension, wherein the second portion is adjacent to the thrust plate has a second radial extension, wherein at least a portion of the bearing pad is tapered with respect to the pad seat, wherein the bearing pad includes a longitudinal protrusion extending towards the thrust plate but longitudinally distanced from the thrust plate, and
    a spring element housed in the pad seat, the spring element positioned around the longitudinal protrusion of the bearing pad.

* * * * *